United States Patent
Fujimaki et al.

(10) Patent No.: US 6,841,106 B1
(45) Date of Patent: Jan. 11, 2005

(54) FOAMED POLYESTER RESIN MOLDING AND PROCESS FOR PRODUCING THE SAME

(75) Inventors: Takashi Fujimaki, Kanagawa-ken (JP); Yoshitomo Urata, Kanagawa-ken (JP)

(73) Assignee: DJK Techno Science Laboratories, Inc., Kanagawa-Ken (JP)

( * ) Notice: Subject to any disclaimer, the term of this patent is extended or adjusted under 35 U.S.C. 154(b) by 0 days.

(21) Appl. No.: 09/787,627
(22) PCT Filed: Oct. 1, 1999
(86) PCT No.: PCT/JP99/05416
§ 371 (c)(1), (2), (4) Date: Mar. 21, 2001
(87) PCT Pub. No.: WO00/20491
PCT Pub. Date: Apr. 13, 2000

(30) Foreign Application Priority Data

Oct. 2, 1998 (JP) .......................... 10/315279

(51) Int. Cl.[7] .................. B29C 44/02; B29C 44/20; C08J 9/16
(52) U.S. Cl. .................. 264/50; 264/53; 264/54; 264/102; 264/911; 521/56
(58) Field of Search .................. 521/56, 79, 182; 264/53, 54, 102, 50, 911

(56) References Cited

U.S. PATENT DOCUMENTS 3,211,678 A * 10/1965 Robinson .................. 521/182
4,284,596 A    8/1981 Inokuchi et al.
4,578,166 A * 3/1986 Uno et al. .................. 8/115.52
5,362,765 A * 11/1994 Taka et al. .................. 521/182

FOREIGN PATENT DOCUMENTS

JP    53-24364    3/1978
WO    94-24188    10/1994

* cited by examiner

Primary Examiner—Allan R. Kuhns
(74) Attorney, Agent, or Firm—Sughrue Mion, PLLC (57) ABSTRACT

The invention provides a method for producing a foamed article comprising the steps of: heating a mixture comprising (a) 100 parts by weight of linear saturated polyester, (b) 0.1 to 10 parts by weight of a mixture as a coupling agent of 0 to 100% by weight of a compound having two epoxy groups in the molecule, and 100 to 0% by weight of a compound having two or more epoxy groups, and (c) 0.01 to 5 parts by weight of a metal salt of a carboxylic acid as a coupling reaction catalyst, at a temperature of a melting point of the polyester or more to provide a melt flow rate of 50 g/10 minutes or less and swell of 10 to 200%, whereby a polyester resin is formed; and heating and foaming the polyester resin using a foaming agent. A foamed article useful as cushioning material, heat insulating material, packaging material, food container, and dividers can be produced by increasing the molecular weight, melt viscosity, and swell (degree of swelling) of PET-based polyesters that have relatively low molecular weight and are brittle, especially recovered polyester, that is used as a prepolymer.

12 Claims, 3 Drawing Sheets

Construction of a Foamer

Fig. 3  Construction of a Foamer

Fig. 4  Construction of a Foamer used in Example 13

US 6,841,106 B1

FOAMED POLYESTER RESIN MOLDING AND PROCESS FOR PRODUCING THE SAME

TECHNICAL FIELD

The present invention relates to a method for producing a polyester resin foamed article having excellent thermostability and mechanical strength by heating and foaming a polyester resin with a foaming agent; the polyester resin having an improved processability by reacting a relatively low molecular weight polyester resin with a small amount of a coupling agent and a trace amount of a catalyst to increase melt viscosity and swell. More particularly, the present invention relates to a method for producing a polyester resin foamed article having an improved processability by repairing and improving a recycled polyethylene terephthalate-based polyester that has decreased molecular weight and properties to increase the molecular weight, melt viscosity and swell.

BACKGROUND ART

Linear aromatic saturated polyesters such as polyethylene terephthalate (PET), polybutylene terephthalate (PBT), and polyethylene-2,6-naphthalene dicarboxylate (PEN) (hereinafter referred to as PET-based polyester) have excellent properties, and are widely used as fibers, films, bottles, and plastics. In the plastic art, molded products of these polyesters are utilized in automobiles, machine parts, electric and electronic materials, building materials, containers, and various industrial goods as high performance resin materials.

In recent years, it is globally recognized that used plastic products that are recovered from factory production processes and the general consumer market need to be recycled with a view to resource saving and environmental protection. The recovery and recycling of used bottles, films, etc. made of polyester have been also positively advancing. However, there are the practical problems such as the molecular weight of crystalline polyester tends to significantly decrease because of the heat history of molding and there is a strong tendency for the crystalline polyester to have increased numbers of free carboxyl groups at the ends of the molecules, which hinders the development of technology for recycling recovered products. As used polyester that have been recovered has decreased molecular weight as compared to virgin pellets, the molecular weight of flakes (crushed matter) of, for example, a large volume of recovered PET bottles is reduced by about half. Accordingly, when the flakes are recycled as a base resin, processability is poor, the qualities of the original PET bottles cannot be reached, and only fibers that can be molded with a low molecular weight resin, and low quality sheets can be produced. The applications of recycled materials are thus limited.

In recent years, plastic foamed articles characterized in light-weight, elasticity, and processability are currently used in large numbers mainly as packages and cushioning materials. If the low molecular weight flakes of recovered PET bottles or new PET bottles can be processed to have high molecular weight, and to have improved melt viscosity capable of foaming, an enormous foamed article market will be developed.

For increasing the molecular weight, known methods include polyester solid phase polymerization, reaction of a chain extending agent (coupling agent) with polyester end groups, or addition of other resins such as elastomers to supplement mechanical properties.

As the chain extending agent (coupling agent), the use of compounds having an isocyanate group, an oxazoline group, an epoxy group, an aziridine group, or a carbodiimide has been proposed. However, such compounds have limited reactivity, heat resistance, and stability, and therefore has limited serviceability. Among these, epoxy compounds are relatively usable as compared to compounds having other groups, and Japanese Patent Laid open No. 57-161124 discloses an addition of a monoepoxy compound, Japanese Patent Laid open No. 7-166419, Japanese Patent Publication Nos. 48-25074, and 60-35944 disclose an addition of a diepoxy compound, but epoxy compounds are problematic in reaction speed, gel generation, melt viscosity, solubility, thermostability, and molded product properties.

Japanese PCT Patent Application Laid open No. 8-508776 proposes a method where PET-based polyester recovered is melted and mixed with a bifunctional epoxy resin and steric hindered hydroxyphenylalkyl phosphonate to increase the molecular weight of the polyester. In this method, although the reaction rate is relatively high, steric hindered hydroxyphenylalkyl phosphonate is expensive, which is not adequate for use in an art requiring low cost recovery and recycling expense. An alternative method is that where rubber or an elastomer is blended into the polyester, but such blends have problems in solubility, heat resistance, and elastic modulus.

Typically, the plastic for use in forming a foamed article is polystyrene or polyethylene having a high molecular weight and high melt viscosity. The PET-based polyesters have insufficient melt viscosity, i.e., flow easily upon melting, even though the molecular weight thereof is increased (IV of about 1.0, number average molecular weight of about 17,000, weight average molecular weight of about 44,000) for a bottle application, and therefore are not suitable resins for forming a foamed articles with highly foamed. Consequently there are no foamed articles made of PET-based polyesters in the world.

DISCLOSURE OF INVENTION

An object of the present invention is to provide a method for producing a polyester resin having improved processability by increasing the molecular weight and melt viscosity of a PET-based polyester that has a relatively low molecular weight and is brittle so that the PET-based polyester can be foam molded, and a method for producing a foamed article using the same.

Through intense studies for solving the aforementioned problems, the present inventors have discovered an industrially advantageous method for producing a PET-based polyester resin having a specific molecular structure and having characteristic properties such as a high melt viscosity and swell suitable for foam molding by reactive processing a saturated polyester with a specific epoxy compound as a coupling agent and a coupling reaction catalyst and by thermal melting the mixture, and a method for producing a foamed article using the same, and thus have completed the present invention.

The present invention provides a method for producing a foamed article by first making modified polyester resin pellets having increased swell of 5 to 200% and JIS melt flow rate (MFR) of less than 50 g/10 minutes measured at 280° C. by preliminary heating a mixture comprising (a) 100 parts by weight of linear saturated polyester, (b) 0.1 to 10 parts by weight of a mixture as a coupling agent of 0 to 100% by weight of a compound having two epoxy groups in the molecule, and 100 to 0% by weight of a compound having more than two epoxy groups, and (c) 0.01 to 5 parts by weight of a metal salt of a carboxylic acid as a coupling reaction catalyst to a temperature greater than the melting point of said polyester and secondly heat foaming said modified polyester resin using a foaming agent.

The present invention also provides a method for producing a foamed article comprising the steps of: heat reacting a mixture comprising (a) 100 parts by weight of linear saturated polyester, (b) 0.1 to 10 parts by weight of a mixture as a coupling agent of 0 to 100% by weight of a compound having two epoxy groups in the molecule, and 100 to 0% by weight of a compound having more than two epoxy groups, and (c) 0.01 to 5 parts by weight of a metal salt of a carboxylic acid as a coupling reaction catalyst, to a temperature greater than the melting point of the polyester in an extruder to increase a molecular weight, melt viscosity, and swell; and simultaneously heating and foaming the mixture by injecting a foaming agent.

The present invention provides a method for producing a foamed article wherein the foaming agent is a volatile foaming agent.

The present invention provides a method for producing a foamed article wherein the volatile foaming agent is an inert gas.

The present invention provides a method for producing a foamed article wherein the inert gas is carbon dioxide gas or nitrogen gas.

The present invention provides a method for producing a foamed article wherein the foaming agent is a heat decomposable foaming agent.

The present invention provides a method for producing a foamed article having an expansion ratio of 1.2 to 100.

The present invention provides a method for producing a foamed article wherein the linear saturated polyester is a polyethylene terephthalate-based aromatic polyester having an intrinsic viscosity of 0.50 to 0.90 dl/g.

The present invention provides a method for producing a foamed article wherein the linear saturated polyester is a recycled product of a recovered polyethylene terephthalate-based aromatic polyester molded product.

The present invention provides a method for producing a foamed article wherein the compound having two epoxy groups in the molecule as the coupling agent contains at least one or more selected from the group consisting of aliphatic polyethylene glycol diglycidyl ether, alicyclic hydrogenated bisphenol A diglycidyl ether, aromatic bisphenol A diglycidyl ether, and bisphenol A diglycidyl ether initial condensate.

The present invention provides a method for producing a foamed article wherein the compound having two or more epoxy groups in the molecule as the coupling agent contains at least one or more selected from the group consisting of aliphatic trimethylolpropane triglycidyl ether, glycerin triglycidyl ether, heterocyclic triglycidyl isocyanulate, aromatic phenol novolac epoxy resin, cresol novolac epoxy resin, and bisresorcinol tetraglycidyl ether.

The present invention further provides a method for producing a foamed article wherein linear saturated polyester prepolymers having intrinsic viscosities of 0.50 to 0.90 dl/g consisting of a polyethylene terephthalate (PET)-based aromatic polyester is reacted with a multi-functional epoxy compound to extend molecular chains via ester bonds and to form a branched long chain structure. In the vicinity of the ester bonds hydroxy groups appear during the reaction, which help a branched long chain structure increase with further reaction with the coupling agent. The present invention provides a method for producing a foamed article comprising; heating in an extruder a mixture comprising (a) 100 parts by weight of an undried linear saturated polyester melted at a temperature above the melting point thereof, and deaerated to less than −600 mmHg, (b) 0.1 to 10 parts by weight of a mixture as a coupling agent of 0 to 100% by weight of a compound having two epoxy groups in the molecule and 100 to 0% by weight of a compound having more than two epoxy groups, and (c) 0.01 to 5 parts by weight of a metal salt of a carboxylic acid as a coupling reaction catalyst to a temperature higher than the melting point of said polyester to make a modified polyester resin having increased swell of 5 to 200% and JIS melt flow rate (MFR) of not more than 50 g/10 minutes measured at 280° C.; injecting a foaming agent into said modified polyester resin in said extruder wherein the foaming agent is dissolved in the modified polyester resin under pressure and cooling; and releasing the modified polyester resin into the atmosphere through a die of said extruder.

The present invention provides a polyester foamed article obtained by increasing the molecular weight of the polyester resin to an MFR of not more than 50 g/10 minutes via an ester bond using a coupling agent having at least two epoxy groups in the molecule; the polyester foamed article having a swell value of 5 to 200% upon measurement of MFR and an expansion ratio of 1.2 to 100.

The melt flow rate (MFR) was measured at 280° C. and a load of 2.16 kg in accordance with JIS K7210.

BRIEF DESCRIPTION OF THE DRAWINGS

In FIG. 1, rectangles represent experimental data of the polyester resin using a tri- or more functional coupling agent (medium to high degree of branch, high swell type long branched chain structure), and circles represent experimental data of the polyester resin using a bifunctional coupling agent (low degree of branch, low swell type long branched chain structure). For comparison, triangles represent measured values of commercially available PET (no branch, no swell, linear structure), and solid triangles represent measured values of the recovered PET flakes. They are also distinguishable by lines a, b, and c.

FIG. 4 is an illustrative combination of devices used in Example 13. The devices include: a first corotating twin screw extruder having a caliber of 43 mm and L/D=43 (one side feed, two vacuum vents front and back of the side feed), a second corotating twin screw extruder having a caliber of 40 mm and L/D=44 (one vacuum vent, one opening for carbon dioxide gas), a gear pump with 30 cc/rev, a third single screw extruder having a caliber of 65 mm and L/D=28, a gear pump with 30 cc/rev, and a circular die having a lip gap of 0.3 mm and a diameter of 86 mm.

BEST MODE FOR CARRYING OUT THE INVENTION

The present invention will be described below in detail.

The (a) linear saturated polyester as the prepolymer for use in the present invention is synthesized using a dicarboxylic acid component and a glycol component, or using hydroxycarboxylic acid. Examples of the dicarboxylic acid component include aromatic dicarboxylic acids such as terephthalic acid, isophthalic acid, naphthalene dicarboxylic acid, diphenyl dicarboxylic acid, diphenylsulfone dicarboxylic acid, diphenoxyethane dicarboxylic acid, diphenylether dicarboxylic acid, methyl terephthalic acid, methyl isophthalic acid; aliphatic, and alicyclic dicarboxylic acids such as succinic acid, adipic acid, sebacic acid, decane dicarboxylic acid, dodecane dicarboxylic acid, cyclohexane dicarboxylic acid. Preferred are aromatic dicarboxylic acids, especially terephthalic acid and 2,6-naphthalene dicarboxylic acid.

Examples of the glycol component include ethylene glycol, trimethylene glycol, tetramethylene glycol, hexamethylene glycol, decamethylene glycol, neopentyl glycol, cyclohexane dimethanol, polyoxyethylene glycol, polyoxypropylene glycol, polyoxytetramethylene glycol. Preferred are ethylene glycol, tetramethylene glycol, cyclohexane dimethanol.

Examples of hydroxycarboxylic acid include α-hydroxycaproic acid, hydroxybenzoic acid, and hydroxyethoxy-benzoic acid.

Specific examples of the linear saturated polyester include polyethylene terephthalate (PET), polybutylene terephthalate (PBT), polyethylene-2,6-naphthalate (PEN), or copolymers thereof. Polyethylene terephthalate (PET) is mass produced worldwide, and is most preferred as the prepolymer in the present invention.

The linear saturated polyester used in the present invention as the prepolymer preferably has an intrinsic viscosity (IV) of 0.50 dl/g or more (which corresponds to a MFR converted value in an exponent of the melt viscosity of 210 g/10 minutes or less; the same shall apply hereinafter), more preferably 0.60 dl/g or more (MFR of about 130 g/10 minutes or less), measured by dissolving the linear saturated polymer in a 1:1 mixture of 1,1,2,2-tetrachloroethane and phenol at 25° C. If the intrinsic viscosity is less than 0.50 dl/g, it is difficult to obtain high molecular weight and high melt viscosity even according to the present invention, and it is contemplated that the resulting polyester resin cannot always, provide excellent foam processability. The upper limit of the intrinsic viscosity is not especially limited, but is typically 0.90 dl/g or less (MFR of about 25 g/10 minutes or more), preferably 0.80 dl/g or less (MFR of about 45 g/10 minutes or more).

In practice, flakes and pellets of PET-based polyester bottles collected and recovered in large quantities are often used as the prepolymer. Normally, PET bottle have relatively high intrinsic viscosity, and therefore the recovered product also has high intrinsic viscosity (IV), and generally about 0.60 to 0.80 dl/g (MFR of about 130 to 45 g/10 minutes), especially about 0.65 to 0.75 dl/g (MFR of about 100 to 55 g/10 minutes).

The polyester molded products that are recovered may be of any shape such as fiber, film, bottles or others and the polyester may contain small amount of other polymers such as polyolefin, and polyacrlyic acid ester. Small ratio of additives such as fillers, pigments, and a dye may also be present. PET bottles are especially suitable for the linear saturated polyester for use in the present invention as the raw material, since a social environment fostering the recovery and recycling of PET bottles is being maintained, and since polyester constituting PET bottles is suitable for recycling.

The (b) coupling agent for use in the present invention is a compound having two or more epoxy groups in the molecule.

Examples of the compound having an average of two epoxy groups in the molecule include aliphatic polyethylene glycol diglycidyl ether, polypropylene glycol diglycidyl ether, tetramethylene glycol diglycidyl ether, 1,6-hexamethylene glycol diglycidyl ether, neopenthyl glycol diglycidyl ether, glycerin diglycidyl ether; alicyclic hydrogenated bisphenol A diglycidyl ether, hydrogenated diglycidyl isophthalic acid ester, 3,4-epoxy cyclohexyl methyl-3,4-epoxy cyclohexane carboxylate, bis(3,4-epoxy cyclohexyl)adipate; heterocyclic diglycidyl hydantoin, diglycidyl oxyalkyl hydantoin; aromatic bisphenol A diglycidyl ether, bisphenol A diglycidyl ether initial condensate, diphenylmethane diglycidyl ether, diglycidyl terephthalic acid ester, diglycidyl isophthalic acid ester, and diglycidyl aniline.

Examples of the compound having an average of three epoxy groups in the molecule include aliphatic trimethylolpropane triglycidyl ether; heterocyclic triglycidyl isocyanulate, triglycidyl cyanurate, triglycidyl hydantoin; and aromatic triglycidyl para- or meta-aminophenol.

Examples of the compound having an average of four epoxy groups in the molecule include tetraglycidyl benzyl ethane, sorbitol tetraglycidyl ether, tetraglycidyl diaminophenyl methane, and tetraglycidyl bisaminomethyl cyclohexane.

Examples of the compound having an average of two to several, i.e., intermediate numbers of, epoxy groups include phenol novolac epoxy resin, and cresol novolac epoxy resin. For example, commercially available Dow epoxy resins have about 2.2, 3.6, 3.8, and 5.5 epoxy groups in the molecule.

The blending amount of the (b) compound having epoxy groups is 0.1 to 10 parts by weight, preferably 0.3 to 5 parts by weight based on 100 parts by weight of the (a) linear saturated polyester. If the amount of the (b) compound having epoxy groups is less than 0.1 parts by weight, the chain extends insufficiently, molecular weight and melt viscosity do not increase, and foam molding cannot be conducted. On the other hand, if the amount of the (b) compound having epoxy groups exceeds 10 parts by weight, the molded products may have decreased fundamental properties, mechanical properties, and elastic modulus, or gel may be produced because of plasticization. The blending amount generally depends on types of the epoxy resin. For example, in the case that a low molecular weight epoxy resin having an epoxy equivalent of 100 to 200 g/eq is reacted with the linear saturated polyester having an intrinsic viscosity of as high as 0.90 dl/g, 0.1 parts by weight of the epoxy resin is enough. In the case that a high molecular weight epoxy resin having an epoxy equivalent of about 2000 g/eq is reacted with the linear saturated polyester having an intrinsic viscosity of as low as 0.50 dl/g, about 10 parts by weight of the epoxy resin is required.

A feature of the present invention is that a mixture of. 0 to 100% by weight of the compound having two epoxy groups in the molecule and 100 to 0% by weight of the compound having more than two epoxy groups are used as the coupling agent to increase a molecular weight of the linear saturated polyester, and to introduce a long branched chain thereinto, whereby PET-based polyester having melt viscosity and swell (degree of swelling) essential for foam molding is produced and foam molded.

According to the present invention, high molecular weight polyester having a swell (degree of swelling) of about 50% at an intrinsic viscosity of 1.0 dl/g can be obtained even when a compound having two epoxy groups in the molecule is used. It is assumed that a hydroxyl group is by-produced when an ester bond is produced by reacting a terminal carboxylic acid group of the linear saturated polyester with an epoxy ring, and the hydroxyl group is reacted with other epoxy rings to form a small number of long branched chains.

Figure 1:
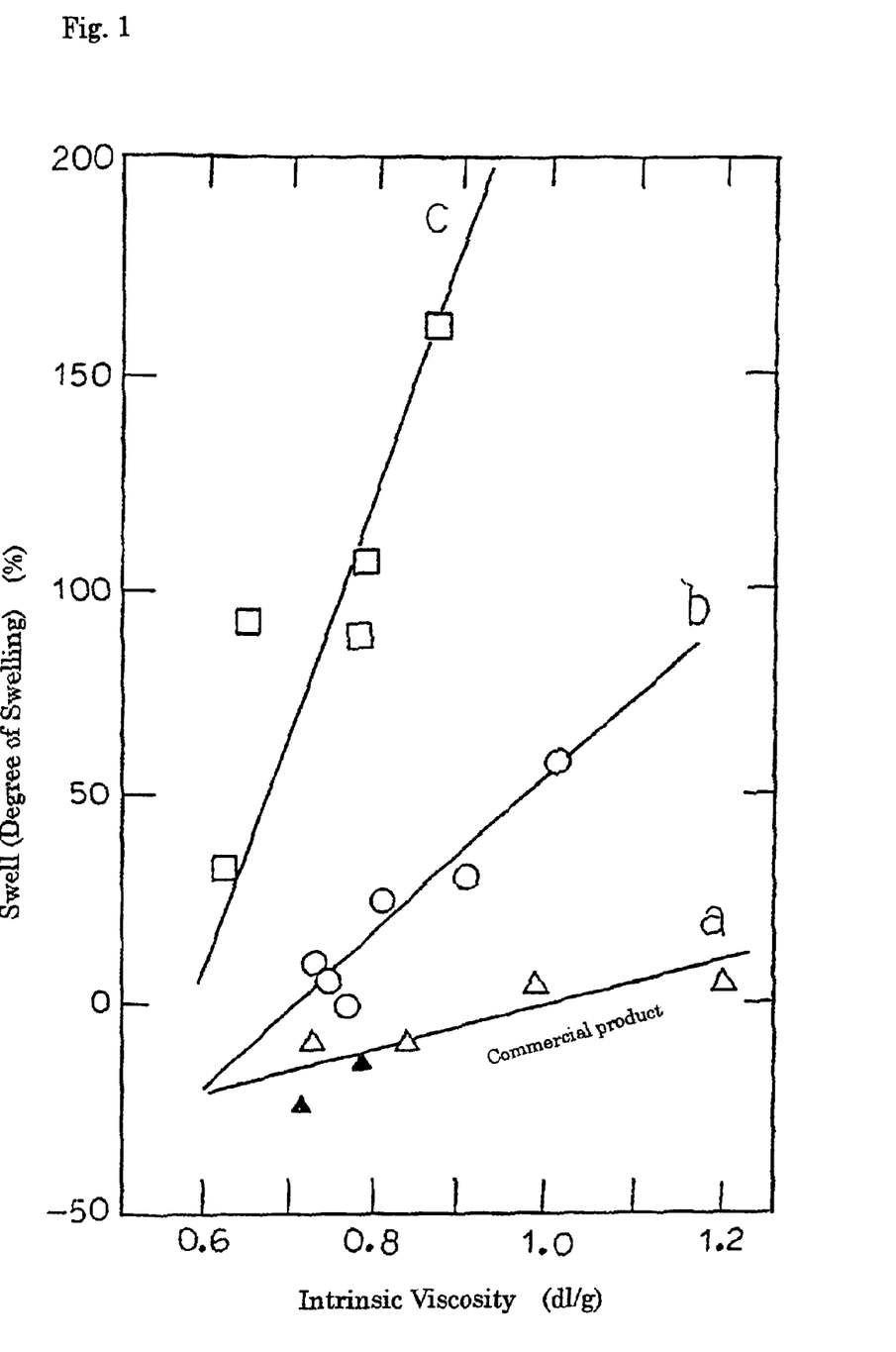
FIG. 1 is a graph of the intrinsic viscosity (IV) and swell (degree of swelling) of the polyester resin according to the present invention.
Figure 2:
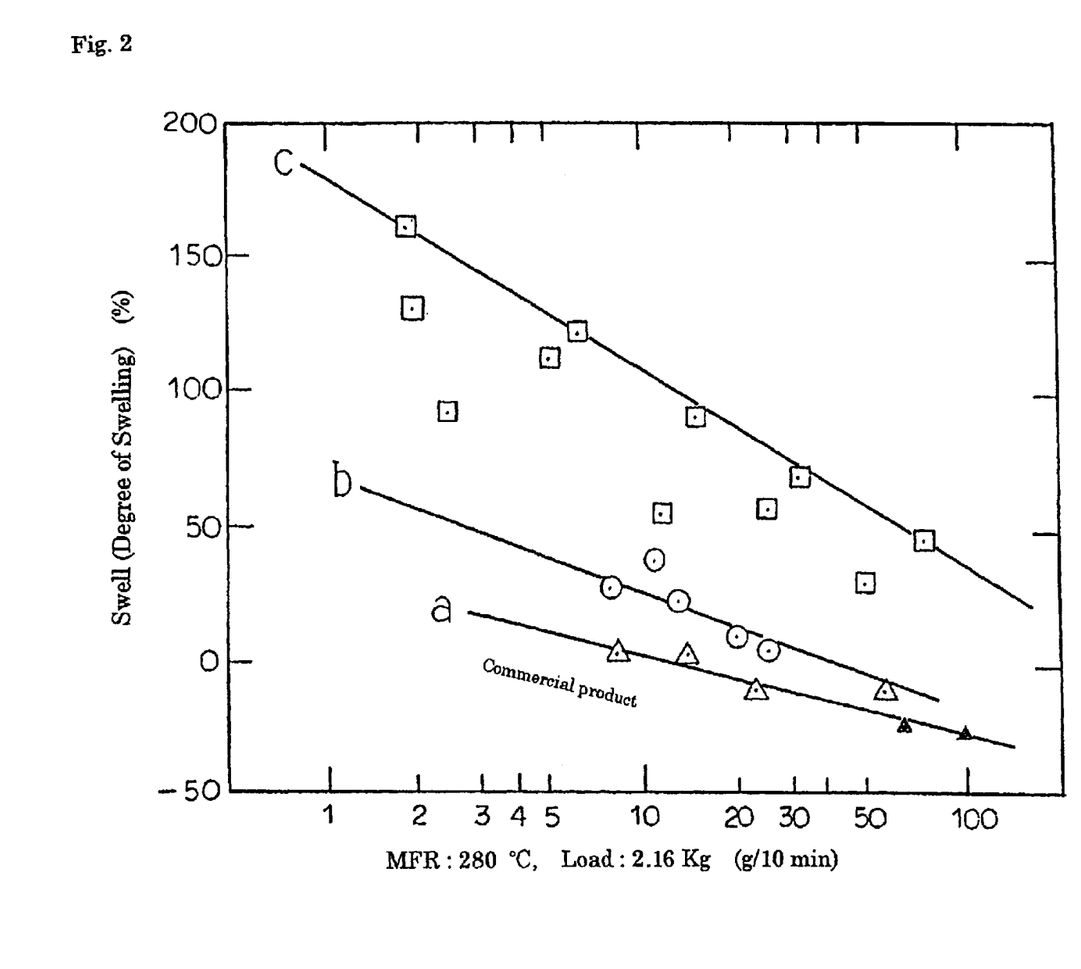
FIG. 2 is a graph of a melt flow rate (MFR) and swell (degree of swelling) of the polyester resin according to the present invention. Marks and lines a, b, and c have the same meanings as in FIG. 1.

As is seen from FIG. 1, commercially available PET resin has swell (degree of selling) of only −20 to +10% at an intrinsic viscosity within the range of 0.6 to 1.2 dl/g. It is considered that melt viscosity and swell (degree of swelling) are low since the commercially available PET resin has a linear structure, and an absolute number average molecular weight of as little as about 20,000, resulting in less "entanglement" in the molecular chains.

According to the present invention, by selecting a compound having more than two epoxy groups and increasing the amount thereof, the degree of branching of the long chain, molecular weight, melt viscosity, and swell (degree of swelling) can be controlled as required for foam molding. Because the polyester according to the present invention has long branched chains, and therefore has sufficient "entanglement" in the molecular chains, swell (degree of swelling) and melt viscosity can be increased freely even if the intrinsic viscosity is in the range of as low as 0.6 to 0.8 dl/g.

The PET-based polyester that can be easily foam molded has a degree of long chain branching of 1 or more, an intrinsic viscosity as a measure of molecular weight of 0.6 to 1.0 dl/g, MFR of 1 to 50 g/10 minutes, preferably 3 to 15 g/10 minutes, and swell (degree of swelling) of about 10 to 200%, preferably about 40 to 150%. The swell (degree of swelling) and the MFR are especially important as a performance index for foam molding. Typically, PET-based polyesters having a swell (degree of swelling) of 10 to 70% are suitable for low to medium expansion ratio foam molding, and PET-based polyesters having a swell (degree of swelling) of 70 to 200% are suitable for high expansion ratio foam molding.

The (c) coupling reaction catalyst for use in the present invention is a catalyst containing at least one or more selected from the group consisting of (i) alkali metal carboxylate, carbonate, and bicarbonate, (ii) alkaline earth metal carboxylate, (iii) aluminum, zinc or manganese carboxylate, and (iv) manganese carbonate.

The catalyst is divided into two types: metal carboxylate, and others. Examples of metal forming metal carboxylate include alkali metals such as lithium, sodium, and potassium; alkaline earth metals such as magnesium, calcium, strontium, and barium; aluminum; zinc; and manganese.

Carboxylic acid for forming a salt with the metal may be monocarboxylic acid, dicarboxylic acid, polycarboxylic acid, polymer-like carboxylic acid such as ionomer, and may have unlimited numbers of carbon atoms. When carboxylic acid includes one or more carbon atoms, such carboxylic acid acts as a nucleus formation agent for foam molding the resulting highly polymerized polyester and affects foam diameter. When a metal salt of medium and higher carboxylic acid, especially medium and higher fatty acid is used as a catalyst, highly polymerized polyester can be foamed with fine foams.

Preferred coupling reaction catalyst for use in the present invention is sodium salt and calcium salt of a carboxylic acid, which are especially safe. Other preferred coupling reaction catalysts are a manganese of a carboxylic acid, which acts rapidly as a reaction catalyst of the terminal carboxyl group of the polyester resin and the epoxy ring. Preferred manganese salt is a manganese salt of an organic carboxylic acid, specifically an aliphatic carboxylic acid having 1 to 20 carbon atoms, especially 1 to 10 carbon atoms, alicyclic carboxylic acid having 3 to 12 carbon atoms, or aromatic carboxylic acid having 7 to 20 carbon atoms. Specific examples of the carboxylic acid for forming the salt include acetic acid, propionic acid, butyric acid, caproic acid, adipic acid, stearic acid, cyclohexane carboxylic acid, benzoic acid, and phthalic acid. More preferred are manganous acetate, manganous acetate anhydride, manganous acetate tetrahydrate, and manganic acetate. Especially preferred is manganous acetate tetrahydrate.

The blending amount of the coupling reaction catalyst including sodium carboxylate, calcium carboxylate, and manganese carboxylate is 0.01 to 5 parts by weight, preferably 0.05 to 1 parts by weight based on 100 parts by weight of the (a) linear saturated polyester. If the blending amount of the coupling reaction catalyst is less than 0.01 parts by weight, catalytic effect is small, and a reaction is insufficient, whereby the molecular weight sometimes does not increase sufficiently. If the blending amount thereof exceeds 5 parts by weight, gel may be produced by a local reaction, and rapid increases in melt viscosity may cause troubles in an extruder.

To the (c) coupling reaction catalyst, a co-catalyst, a crystallization nucleus formation agent, and a crystallization promoter may be added, and include a halide, carbonate, and bicarbonate of an alkali metal and an alkaline earth metal such as lithium chloride, potassium iodide, and potassium carbonate; and alkali metal salts and alkaline earth metal salts such as a lithium salt, a sodium salt, a potassium salt, a beryllium salt, a magnesium salt, a calcium salt, a strontium salt, and a barium salt of aryl or alkyl substituted phosphine, e.g., tributyl phosphine, trioctyl phosphine, triphenyl phosphine, of saturated fatty acid, e.g., butyric acid, valerianic acid, caproic acid, lauric acid, myristic acid, palmitic acid, stearic acid, behenic acid, and montan acid, and of unsaturated fatty acid, e.g., crotonic acid, oleic acid, and elaidic acid.

Other than the (a) polyester, the (b) compound having epoxy groups, and the (c) manganese salt, the polyester resin composition of the present invention may comprise a foaming nucleus formation agent; a filler such as talc, calcium carbonate, calcium oxide, kaolin, alumina, and aluminum hydroxide; a reinforcing material such as glass fiber, carbon fiber, aramid fiber, and whisker; a pigment such as carbon black, antimony oxide, molybdenum disulfide, and titanium oxide; a colorant; a stabilizer; an ultraviolet ray absorber; an antioxidant; a viscosity controlling agent; an antistatic agent; a conductive agent; a flowing agent; a mold releasing agent; a cross coupling agent; and other resins.

Examples of the antioxidant include a hindered phenol-based antioxidant such as p-t-butylhydroxy toluene, and p-t-butylhydroxy anisole; and a sulfur-based antioxidant such as distearylthiodipropionate, and dilaurylthiodipropionate. Examples of the heat stabilizer include triphenyl phosphite, trilauryl phosphite, and trisnonylphenyl phosphite.

Examples of the ultraviolet ray absorber include p-t-butylphenyl salicylate, 2-hyroxy-4-methoxybenzophenone, 2-hydroxy-4-methoxy-2'-carboxybenzophenone, and 2,4,5-trihydroxybutyrophenone. Examples of the antistatic agent include N,N-bis(hydroxyethyl)alkylamine, alkylamine, alkylallylsulfonate, and alkylsulfonate. Examples of the flame retardant include hexabromocyclododecane, tris-(2,3-dichloropropyl)phosphate, and pentabromophenylallyl ether.

A method for producing the polyester resin of the present invention using a reactive processing will be described below. As the (a) linear saturated polyester, ordinary new resin, flakes, particulate matters, powder, chips, and melt of recovered PET bottle in any shape can be used. With regard to drying, the polyester prepolymer as the main component is advantageously dried using dehumidified air, hot air, or heated nitrogen at 110 to 160° C. for several to ten or more hours. Respective components are mixed using a mixer such as the Henschel mixer, and then provided to an extrusion pelletizer, or directly to a molding machine. Heat melting temperature is desirably greater than the melting point of the polyester and not more than 350° C. in view of controlling the reaction. Especially preferred temperature is 320° C. or less. If the temperature exceeds 350° C., the polyester may be colored, or subjected to thermal decomposition. Respective components are mixed easily. The (a) component and the (b) component can be mixed, and then the (c) component added thereto in any step. The (a) component and the (c) component can be mixed, and then the (b) component added thereto in any step.

The reaction apparatus for heating and melting may be a single screw extruder, a twin screw extruder, a two stage extruder combining them, or a kneader-ruder, etc. The reactive processing for producing the polyester resin for use in the present invention is conducted in the extruder for a short time. Accordingly, the L/D of the extruder is preferably 30 to 50 rather than 10 to 30.

According to the present invention, the molecular weight of the linear saturated polyester prepolymer generally increases, and the number of the terminal carboxyl groups decreases in a short time, e.g., for 30 seconds to 60 minutes, preferably 1 to 30 minutes, most preferably 2 to 15 minutes, although it depends on performance of the extruder. It is assumed that the coupling catalyst promotes a reaction of the carboxyl group of the polyester and the epoxy ring, and the polyester molecules having terminal carboxyl groups are linked by multifunctional epoxy components, whereby molecule chains grow and branch to increase the molecular weight and to decrease the number of the terminal carboxyl groups. If the polyester is heated and melted only by adding the coupling catalyst, neither the molecular weight increases nor does the number of terminal carboxyl groups decrease. If the polyester is heated and melted only by adding the multifunctional epoxy component, it is difficult to increase the molecular weight in a short time because reaction speed is very slow. When the three components of (a) component, the (b) component, and the (c) component according to the present invention coexist, the molecular weight, melt viscosity, and swell increase noticeably. (Foaming using volatile foaming agent Examples of a volatile foaming agent for use in the present invention include aliphatic hydrocarbons such as propane, butane, pentane, isobutane, neopentane, isopentane, hexane, and butadiene; halogenated hydrocarbons such as methyl chloride, methylene chloride, dichlorofluoromethane, chlorotrifluoromehtane, dichlorodifluoromethane, chlorodifluoromethane, trichlorofluoromethane, and substitute Flons such as HCFC-22, HCFC-123, HCFC141b, HCFC142b, HFC134a, and HFC-152a; or inert gases such as carbon dioxide gas, nitrogen, argon, and compressed air.

Among these volatile foaming agents, inert gas (specifically, carbon dioxide gas, nitrogen gas, argon, and compressed air) has a smaller global warming coefficient than those of the hydrocarbon gases and the halogenated hydrocarbons, and does not deplete the ozone layer. In view of future mounting concern for global environmental protection, especially the global warming coefficient, and ozone layer protection, inert gas is an environmentally safe. and suitable foaming agent. Among the inert gases, carbon dioxide gas which generally has the highest solubility coefficient to a resin is more preferable, although nitrogen may be preferable depending on foaming magnification of a molded product.

To produce a foam using such a volatile foaming agent the composition containing the polyester of the present invention as a main component is melted and kneaded in an extruder, into which the volatile foaming agent is injected, or the composition is immersed in the volatile foaming agent, and extruded from an extruder into air, whereby a foamed article having an expansion ratio of 1.2 to 100 can be produced.

If the foaming magnification is less than 1.2, the features of a foamed article are not generated, and if the foaming magnification exceeds 100, the bubbles become continuous, and surface irregularities become great, which results in an impractical foamed article. Kneading temperature should exceed the apparent melting point of the polyester composition containing the volatile foaming agent and is about 200 to 350° C., preferably 210 to 300° C. If the kneading temperature is less than 200° C., viscosity is too high for kneading, and if the kneading temperature exceeds 300° C., the polyester resin is unfavorably deteriorated.

When inert gas is used as the foaming agent, it is difficult to provide high magnification as compared with hydrocarbon and the halogenated hydrocarbon because the inert gas has high solubility to the resin, and gas is largely dissipated from the bubbles during foam formation. To provide high expansion ratio, an effective measure is to apply pressure to the polyester resin kneaded with the foaming agent to fully dissolve carbon dioxide gas into the resin, and to cool.

Figure 3:
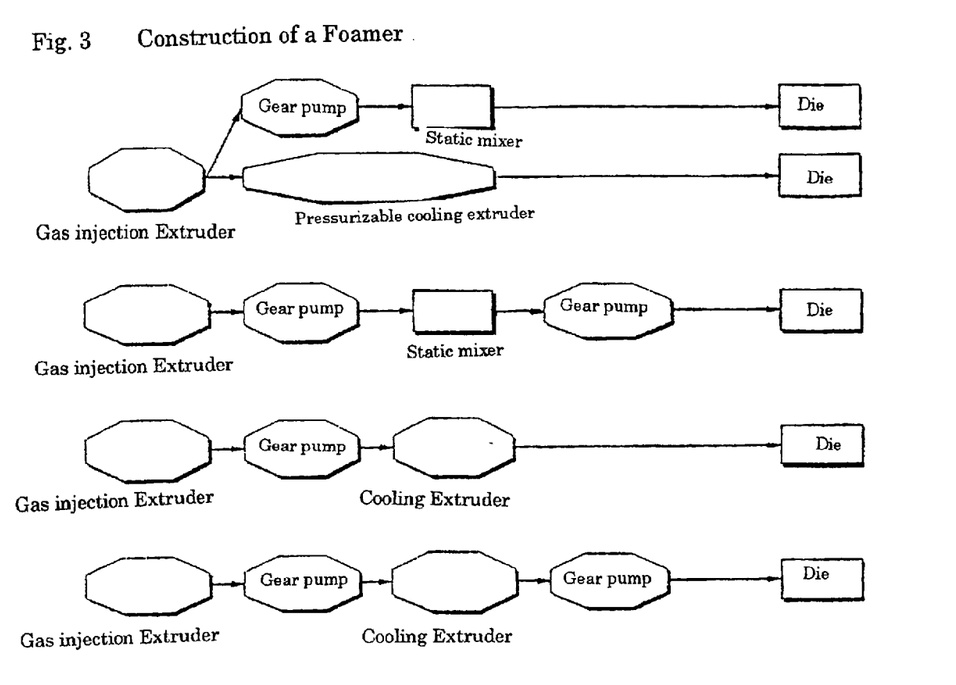
FIG. 3 is a schematic combination of foaming devices according to the present invention.

Specifically, for applying pressure and cooling, a resin supplied from a kneader is fed to a long straight pipe on which a static mixer is disposed; a length of the long straight pipe and the number of elements of the static mixer are adjusted, whereby the residence time of the resin and cooling ability are adjusted. Another extruder having cooling ability may be further disposed to increase the residence time. Preferably, a gear pump is disposed immediately after the kneader to raise the pressure, the polyester resin then being fed to the cooling zone. FIG. 3 shows a schematic combination of foaming devices using mainly inert gas according to the present invention.

In order to dissolve carbon dioxide gas sufficiently in the resin, it is preferred that the resin pressure at the inlet of the cooling zone be 5 MPa or more. To provide a foamed article having a high expansion ratio of 15 or more, the resin pressure is preferably 10 MPa or more, more preferably 20 MPa or more. If the resin pressure is less than 5 MPa, carbon dioxide gas as the foaming agent is insufficiently dissolved in the resin to provide a foamed article having bulky foams with a low expansion ratio. On the other hand, withstand pressure for a resin finishing machine including an extruder is generally designed to be 50 MPa, a resin pressure exceeding 50 MPa being dangerous. It is preferred that the resin pressure be 45 MPa or less with safety taken into consideration. Of course, if forming machine design is changed, the resin pressure may exceed 50 MPa.

The resin temperature profile at the cooling zone, i.e., from the outlet of the kneading zone to the outlet of the extrusion die at the latter stage, is preferably set to be changed smoothly at a substantially constant rate. Preferably, it reaches an intended resin temperature up to the inlet of the extrusion die, and the resin temperature is kept constant within the die.

When the polyester resin in which the inert gas is fully dissolved is fed to the extrusion die to release the resin into air from the outlet of the die, whereby bubbles grow to form a foamed article, it is preferred that the pressure be kept at the aforementioned level as near as possible to the outlet of the die. (Foaming using heat decomposable foaming agent)

High temperature heat decomposable foaming agents for use in the present invention are various organic or inorganic heat decomposable foaming agents. Examples of the organic foaming agents include p-toluene sulfonyl semicarbazide (nominal decomposition temperature of 220 to 235° C.), nitroguanidine (235 to 240° C.), oxalylhydrazide (230 to 250° C.), 5-phenyl tetrazole (about 210 to 250° C.), hydorazylcarbonylamide (240 to 260° C.), trihydrazynotriazine (260 to 270° C.), and diisopropylazodicarboxylate (about 260 to 300° C.). Examples of the inorganic foaming agent include barium azodicarboxylate (240 to 250° C.), strontium azodicarboxylate, strontium potassium azodicarboxylate, aluminum hydroxide (230 to 260° C.), and magnesium hydroxide (300 to 400° C.). These high temperature heat decomposable foaming agents can be used in the form of a master batch included in the amount of 10 to 20% with a base resin having a melting point lower than that of the PET-based polyester such as polyethylene, polypropylene, polystyrene, ABS resin, and aliphatic polyester (PCL, PBSU, PLA).

The foamed article generally has an expansion ratio of generally 1.02 to 20. Such foamed article having the expansion ratio of 1.02 to 20 comprising a high molecular, high melting tension, and high swell PET-based polyester can be produced by mixing 100 parts by weight of a polyester prepolymer with 0.5 to 10 parts by weight (converted contents) of pure heat decomposable foaming agent or a master batch thereof, while/and then heating it at the decomposition temperature of the foaming agent or higher. If the expansion ratio is less than 1.02 times, the foamed article has no feature, and if the expansion ratio exceeds 20 times, foams connect each other to increase surface irregularity, and therefore such foamed article cannot be used practically.

Any known kneading methods for dispersing the foaming agent can be used. Preferably, a kneader, a roll, or an extruder is used.

The foamed article having a heating value of combustion of about 6,000 kcal/kg measured in accordance with JIS M8814, which is approximately half of those of polyethylene or polypropylene (10000 to 11000 Kcal/Kg). When waste from the foamed article is burned, the wall material of the combustion equipment is less corroded and damaged.

EXAMPLE

To facilitate the understanding of the present invention, the following Examples and Comparative Examples are cited. Instruments for measuring physical properties, and measurement conditions are as follows:

1. Intrinsic viscosity (IV) was measured with a Cannon-Fenske viscometer at 25° C. using a 1:1 mixed solvent of 1,1,2,2-tetrachloroethane and phenol.

2. Melt flow rate (MFR) was measured at 280° C. under a load of 2.16 kg in accordance with JIS K7210.

3. Swell (degree of swelling) was determined by having a sample flow at 280° C. under a load of 2.16 kg using a melt indexer for MFR, cutting the indexer when the sample flows 2.0 cm, measuring the diameter of the indexer 5.0 mm above the lowermost end, and calculating the value using the following equation. The diameter was measured several times, and an average value was determined. In the equation, the numerical value 02.09511 is the nozzle diameter of the melt indexer for MFR.

$$\text{Swell } (\%)=[(\text{average value of the diameter}-2.095)/2.095]\times 100$$

4. Molecular weight was measured using the GPC method.

SYSTEM-21 manufactured by Showa Denko K. K.

Columns of sample, and reference: Shodex KF-606M×2

Solvent: hexafluoroisopropylalcohol

Column temperature: 40° C.

Injection rate: 20 $\mu$l

Flow rate: 0.6 ml/min

Polymer concentration: 0.15% by weight

Detector: shodex RI-74

Molecular weight conversion standard: PMMA (Shodex M-75)

5. Melt viscosity was measured using a viscoelasticity measurement device.

Dyn Alyser DAR-100 manufactured by REOLOGICA Corp., Sweden

Specimen: 2 cm×2 cm with a thickness of 2 mm

280° C. under nitrogen atmosphere

Torsional vibration between hot plates

Example 1

[Production of medium branched polyester resin (A) using bifunctional and trifunctional epoxy coupling agents, and foam molding with chemical foaming agent]

100 parts by weight of clear flakes supplied by Yono PET Bottle Recycle K. K. (from recycled PET bottles, intrinsic viscosity of 0.775 dl/g, MFR of 65 g/10 min) hot-air dried at 120° C. for about 12 hours, 0.6 parts by weight of ethylene glycol diglycidyl ether (Epolight 40E from Kyoeisha Yushi Chemical Co., Ltd., having epoxy equivalence of 135 g/eq, pale yellow liquid) which is a bifunctional epoxy compound as a coupling agent, 0.2 parts by weight of trimethylol propane triglycidyl ether (Epolight 100MF from Kyoeisha Yushi Chemical Co., Ltd., having epoxy equivalence of 150 g/eq, pale yellow liquid) which is a trifunctional epoxy compound as another coupling agent, and 0.1 parts by weight of manganous acetate tetrahydrate fine powder as a coupling reaction catalyst were mixed in a Henschel mixer under nitrogen atmosphere for 2 minutes.

The flake mixture (A1) was reacted by kneading in a tandem extruder consisting of a twin screw two stage vacuum extruder having L/D=34 and a caliber of 30 mm, and a single screw extruder having L/D=28 and a caliber of 50 mm at a setting temperature of 270° C., and the strand was water cooled and pelletized with a rotating cutter. Pellets were hot-air dried at 120° C. for several hours, and stored in a moisture proof bag. The medium branched polyester resin (A) obtained had an intrinsic viscosity of 0.834 dl/g, MFR of 12 g/10 min, and swell (degree of swelling) of 54%.

100 parts by weight of the polyester (A) of the present invention, 4.4 parts by weight of a PET foaming agent master batch (Polythrene EE-201 from Eiwa Chemical Ind., Co., Ltd., polyethylene base, a decomposition temperature of 210° C., yellow pellets), and 0.5 parts by weight of talc were kneaded in the aforementioned tandem extruder at a setting temperature of 280° C., and extruded with a T die having a width of 100 mm at a die setting temperature of 270° C. to form a foamed sheet through a chill roll. Thus, a foamed sheet having an expansion ratio of 1.7, and a foam diameter of 0.4 mm to 0.6 mm was obtained.

Example 2

100 parts by weight of the polyester (A) in Example 1, 8 parts by weight of oxalylhydrazide (a decomposition temperature of 230 to 270° C.), and 0.5 parts by weight of talc were kneaded in the tandem extruder in Example 1 at a setting temperature of 290° C., and extruded with a T die having a width of 100 mm at a die setting temperature of 280° C. to form a foamed sheet. Thus, a foamed a sheet having an expansion ratio of 12, and a foam diameter of 0.4 mm to 0.6 mm was obtained.

Example 3

In the process conditions in Example 1, without taking pellets of the polyester (A) out for further mixing, 100 parts by weight of the clear flakes, 0.6 parts by weight of ethylene glycol diglycidyl ether (Epolight 40E), 0.2 parts by weight of trimethylol propane triglycidyl ether (Epolight 100MF), 0.1 parts by weight of manganous acetate tetrahydrate fine powder, 2.0 parts by weight of a PET foaming agent master batch (Polythrene EE-201), and 0.3 parts by weight of talc were mixed in a Henschel mixer under nitrogen atmosphere for 2 minutes to prepare the flake mixture (A2). The flake mixture (A2) was processed as in Example 1 to form a foamed article. Thus, a foamed article having an expansion ratio of 1.2 times, and a foam diameter of 0.4 mm to 0.6 mm was obtained directly from the PET flake mixture without going through pellets.

Comparative Example 1

Clear flakes supplied by Yono PET Bottle Recycle K. K. (from recycled PET bottles) had intrinsic viscosity of 0.775 dl/g, MFR of 65 g/10 min, swell (degree of swelling) of −18%, a weight average molecular weight Mw of 33,200, a number average molecular weight Mn of 12,800, and a molecular weight distribution Mw/Mn=2.6. 100 parts by weight of such prepolymer hot-air dried at 120° C. for about 12 hours, 4.4 parts by weight of a PET foaming agent master batch (Polythrene EE-201) with no coupling agents and coupling reaction catalyst, and 0.5 parts by weight of talc were mixed in a Henschel mixer under nitrogen atmosphere. The flake mixture was processed as in Example 1. The resin flowed through die holes like water, and therefore no foam molding could be performed. The effluent had an intrinsic viscosity of 0.68 dl/g, and MFR of 90 g/10 min.

Comparative Examples 2 to 5

Commercial Pellets

The basic properties of four types of commercial polyethylene terephthalate (PET) pellets having different molecular weights were determined and are shown in Table 1. The pellets had an Mw of 27,800, Mn of 11,500, Mw/Mn=2.42, and melt viscosity of 700 poise (Comparative Example 2), Mw of 35,900, Mn of 14,000, and Mw/Mn=2.57 (Comparative Example 3), Mw of 42,500, Mn of 16,900, Mw/Mn=2.52, and melt viscosity of 2050 poise (Comparative Example 4), and Mw of 50,500, Mn of 18,200, Mw/Mn=2.77, and melt viscosity of 2230 poise (Comparative Example 5) respectively. Such commercial PET pellets had low polymerization degree, and narrow molecular weight distribution as compared with mass-production plastics. The swell (degree of swelling) essential for foam molding was 5% or less, or a minus value. As apparent from these results, these commercial pellets had linear structures, and were entirely different from the resin of the present invention having an extremely high swell value.

These commercial PET pellets were foamed as in Comparative Example 1 under the same conditions in Example 1. However, foam molding could not be conducted.

Example 4

[Production of high branched polyester resin (B) using trifunctional epoxy coupling agent, and foam molding with volatile foaming agent]

100 parts by weight of clear flakes supplied by Yono PET Bottle Recycle K. K. (from recycled PET bottles, intrinsic viscosity of 0.769 dl/g, MFR of 70 g/10 min, swell of −22%) hot-air dried at 120° C. for about 12 hours, 1.1 parts by weight of trifunctional trimethylol propane triglycidyl ether (Epolight 100MF from Kyoeisha Yushi Chemical Co., Ltd., having epoxy equivalence of 150 g/eq, pale yellow liquid) as a coupling agent, and 0.15 parts by weight of calcium stearate as a coupling reaction catalyst were mixed in a Henschel mixer under nitrogen atmosphere for 2 minutes.

The flake mixture (B1) was reacted by kneading in a twin screw two stage vacuum extruder having L/D=32 and a caliber of 45 mm at a setting temperature of 270° C., and the strand was water cooled and pelletized with a rotating cutter. Pellets were hot-air dried at 120° C. for several hours, and stored in a moisture proof bag. The high branched polyester resin (B) obtained had an intrinsic viscosity of 0.790 dl/g, MFR of 5.2 g/10 min, and swell (degree of swelling) of 112%.

100 parts by weight of the high branched polyester resin (B), and 0.5 parts by weight of talc having a diameter of about 2 μm were kneaded in the first stage extruder of the aforementioned tandem extruder at a setting temperature of 260° C. 16 parts by weight of alternative Flon HCFC22 was added to 100 parts by weight of the mixed resin in a middle position of cylinder of the second stage extruder at a setting temperature of 70° C. The mixture was extruded into air with a circular die having a caliber of 60 mm and a lip gap of 0.4 mm at a die setting temperature of 210° C. to form a foamed article. Thus, a foam sheet having an expansion ratio of 20 times, a foam diameter of 0.5 mm to 0.7 mm, a thickness of 1.5 mm, and a wide of 400 mm was obtained.

Example 5

100 parts by weight of the high branched polyester resin (B) in Example 4, and 0.5 parts by weight of talc having a diameter of about 2 μm were kneaded in the first stage extruder of the aforementioned tandem extruder at a setting temperature of 260° C. 7 parts by weight of alternative Flon HCFC22 was added to 100 parts by weight of the mixed resin in a middle position of cylinder of the second extruder at a setting temperature of 270° C. The mixture was extruded into atmosphere through a circular die having a caliber of 60 mm and a gap of 0.4 mm at a die setting temperature of 210° C. to form a foamed article. Thus, a foam sheet having an expansion ratio of 8, a foam diameter of 0.2 mm to 0.4 mm, a thickness of 1 mm, and a wide of 400 mm was obtained.

Example 6

[Production of extremely high branched polyester resin (C) using bifunctional and multi-functional epoxy coupling agents, and foam molding at high expansion ratio with volatile foaming agent]

100 parts by weight of clear flakes supplied by Yono PET Bottle Recycle K. K. (from recycled PET bottles, intrinsic viscosity of 0.769 dl/g, MFR of 70 g/10 min, swell of −22%) hot-air dried at 120° C. for about 12 hours, 0.5 parts by weight of bifunctional ethylene glycol diglycidyl ether (Epolight 40E from Kyoeisha Yushi Chemical Co., Ltd., having epoxy equivalence of 135 g/eq, pale yellow liquid) as a coupling agent, 0.8 parts by weight of 3.8 functional novolac epoxy resin (Dow epoxy novolac resin D.E.N.439 from Dow Chemical Corp, having epoxy equivalence of 191 to 210 g/eg) as another coupling agent, and 0.1 parts by weight of manganous acetate tetrahydrate fine powder as a coupling reaction catalyst were mixed in a Henschel mixer under nitrogen atmosphere for 2 minutes.

The flake mixture (C1) was reacted by kneading in the tandem mixer in Example 1 at a setting temperature of 270° C., and the strand was water cooled and pelletized with a rotating cutter. Pellets were hot-air dried at 120° C. for several hours, and stored in a moisture proof bag. The high branched polyester resin (c) obtained had an intrinsic viscosity of 0.882 dl/g, MFR of 1.8 g/10 min, and swell (degree of swelling) of 160%.

100 parts by weight of the extremely high branched polyester resin (c), and 0.5 parts by weight of talc having a diameter of about 2 $\mu$m were kneaded in the first extruder of the aforementioned tandem extruder at a setting temperature of 260° C. 25 parts by weight of alternative Flon HCFC22 was added to 100 parts by weight of the mixed resin in a middle position of cylinder of the second extruder at a setting temperature of 270° C. The mixture was extruded into atmosphere through a circular die having a caliber of 60 mm and a lip gap of 0.4 mm at a die setting temperature of 210° C. to form a foamed article. Thus, a foam sheet having an expansion ratio of 40 times, a foam diameter of 0.6 mm to 0.9 mm, a thickness of 1.5 mm, and a wide of 400 mm was obtained.

Example 7

[Production of extremely high branched polyester resin (D) using trifunctional epoxy coupling agent, and foam molding with carbon dioxide gas as foaming agent]

100 parts by weight of clear flakes supplied by Yono PET Bottle Recycle K. K. (from recycled PET bottles, intrinsic viscosity of 0.775 dl/g, MFR of 57 g/10 min, swell of −24%) hot-air dried at 120° C. for about 12 hours having the moisture content of 120 ppm, 0.70 parts by weight of trifunctional trimethylol propane triglycidyl ether (Epolight 100MF from Kyoeisha Yushi Chemical Co., Ltd., having epoxy equivalence of 150 g/eq, pale yellow liquid) as a coupling agent, 0.10 parts by weight of lithium stearate as a coupling reaction catalyst, and 0.05 parts by weight of manganous acetate tetrahydrate as another coupling reaction catalyst were mixed in a Henschel mixer under nitrogen atmosphere for 2 minutes.

The flake mixture (D1) was reacted by kneading in a twin screw three stage vacuum extruder having L/D=43, and a caliber of 43 mm at a setting temperature of 280° C. under −640 mmHg or less, and the strand was water cooled and pelletized with a rotating cutter. Pellets were hot-air dried at 120° C. for several hours, and stored in a moisture proof bag. The extremely high branched polyester resin (D) obtained had an intrinsic viscosity of 0.89 dl/g, MFR of 2.0 g/10 min at 280° C., swell (degree of swelling) of 85%, and melt viscosity of 420,000 poise.

100 parts by weight of the extremely high branched polyester resin (D), and 1.0 parts by weight of talc having a diameter of about 2 $\mu$m were kneaded in a single screw extruder having L/D=34, and a caliber of 40 mm at a setting temperature of 270° C. 2 parts by weight of carbon dioxide gas was added to 100 parts by weight of the mixed resin in the first stage cylinder. The pressure of the extruder was raised using a gear pump, and the resin was passed through a static mixer (having a caliber of 20 mm, 12 elements) set at a temperature of 250° C. to 240° C. per zone, and then cooled. The mixture was extruded into air with a circular die having a caliber of 85 mm and a lip gap of 0.2 mm at a die setting temperature of 240° C. to form a foamed article. Thus, a foam sheet having an expansion ratio of 4.5, a foam diameter of 0.3 mm to 0.5 mm, a thickness of 1.0 mm, and a wide of 700 mm was obtained.

Example 8

100 parts by weight of the extremely high branched polyester resin (D) in Example 7, and 1.0 parts by weight of talc having a diameter of about 2 $\mu$m were kneaded in the aforementioned first stage extruder at a setting temperature of 270° C. 5 parts by weight of carbon dioxide gas was added to 100 parts by weight of the mixed resin in the first stage cylinder. The pressure of the extruder was raised using a gear pump, and the resin was passed through the second stage extruder set at a temperature of 250° C. to 225° C. being controlled at each zones, and then cooled, while the pressure of the resin was kept at 15 MPa. The mixture was extruded into atmosphere through a circular die having a caliber of 85 mm and a lip gap of 0.2 mm at a die setting temperature of $_{225}$° C. to form a foamed article. Thus, a foam sheet having an expansion ratio of 12, a foam diameter of 0.15 mm to 0.35 mm, a thickness of 1 mm, and a wide of 700 mm was obtained.

Example 9

[Production of Extremely High Branched Polyester Resin (E) Using bi-, Tri-functional Epoxy Coupling Agents, and Foam Molding at High Expansion Ratio With Carbon Dioxide Gas as Foaming Agent ]

100 parts by weight of clear flakes supplied by With PET Bottle Recycle K. K. (from recycled PET bottles, intrinsic viscosity of 0.735 dl/g, MFR of 52 g/10 min, swell of −19%) hot-air dried at 120° C. for about 12 hours, 0.24 parts by weight of bifunctional ethylene glycol diglycidyl ether (Epolight 40E from Kyoeisha Yushi Chemical Co., Ltd., having epoxy equivalence of 135 g/eq, pale yellow liquid) as a coupling agent, 0.36 parts by weight of trifunctional trimethylol propane triglycidyl ether (Epolight 100MF from the same company, having epoxy equivalence of 150 g/eq) as another coupling agent, 0.10 parts by weight of calcium stearate as a coupling reaction catalyst, and 0.05 parts by weight of lithium stearate as another coupling reaction catalyst were mixed in a Henschel mixer under nitrogen atmosphere for 2 minutes.

The flake mixture (E1) was reacted by kneading in the tandem extruder in Example 1 at a setting temperature of 280° C. under vacuum of −640 mmHg or less, and the strand was water cooled and pelletized with a rotating cutter. Pellets were hot-air dried at 120° C. for several hours, and stored in a moisture proof bag. The extremely high branched polyester resin (E) obtained had an intrinsic viscosity of 0.84 dl/g, MFR of 4.4 g/10 min, swell (degree of swelling) of 77%, and melt viscosity of 160,000 poise.

100 parts by weight of the extremely high branched polyester resin (E), and 1.0 parts by weight of talc having a diameter of about 2 μm were kneaded in the first stage extruder of the tandem extruder in Example 8 at a setting temperature of 270° C. 7 parts by weight of carbon dioxide gas was added to 100 parts by weight of the mixed resin in the first stage cylinder. The pressure of the extruder was raised using a gear pump, and the resin was passed through the second stage extruder set at a temperature of 250° C. to 220° C. being controlled at each zones, and then cooled, while the pressure of the resin was kept at 25 MPa. The mixture was extruded into atmosphere through a circular die having a caliber of 85 mm and a lip gap of 0.15 mm at a die setting temperature of 220° C. to form a foamed article. Thus, a foam sheet having an expansion ratio of 21 times, a foam diameter of 0.15 mm to 0.35 mm, a thickness of 1.0 mm, and a wide of 700 mm was obtained.

Example 10
[Production of Extremely High Branched Polyester Resin (D) Using Trifunctional Epoxy Coupling Agent, and Foam Molding With Alternative Flon Foaming Agent ]

100 parts by weight of clear flakes supplied by Yono PET Bottle Recycle K. K. (from recycled PET bottles, intrinsic viscosity of 0.775 dl/g, MFR of 57 g/10 min, swell of −24%) hot-air dried at 120° C. for about 12 hours, 0.70 parts by weight of trifunctional trimethylol propane triglycidyl ether (Epolight 100MF from Kyoeisha Yushi Chemical Co., Ltd., having epoxy equivalence of 150 g/eq, pale yellow liquid) as a coupling agent, 0.10 parts by weight of calcium stearate as a coupling reaction catalyst, 0.05 parts by weight of manganous acetate tetrahydrate as another coupling reaction catalyst, and 1.0 parts by weight of talc having a diameter of about 2 μm as a foaming core agent were mixed in a Henschel mixer under nitrogen atmosphere for 2 minutes.

The flake mixture (D1) was reacted by kneading in a twin screw three stage vacuum extruder having L/D=43 and a caliber of 43 mm at a setting temperature of 280° C., and then directly fed to a single screw extruder having L/D=34 and a caliber of 50 mm at a setting temperature of 270° C. 16% by weight of alternative Flon gas R-134a was added to 100 parts by weight of the mixed resin in the first stage cylinder. The pressure of the extruder was raised using a gear pump, and the resin was passed through a static mixer (having a caliber of 20 mm, 12 elements) set at a temperature of 250° C. to 225° C. being controlled at each zones, and then cooled. The mixture was extruded into atmosphere through a circular die having a caliber of 85 mm and a lip gap of 0.2 mm at a die setting temperature of 225° C. to form a foamed article. Thus, a foam sheet having an expansion ratio of 18, a foam diameter of 0.15 mm to 0.35 mm, a thickness of 1 mm, and a width of 700 mm was obtained.

Example 11
[Production of Extremely High Branched Polyester Resin (D) Using Trifunctional Epoxy Coupling Agent, and Foam Molding With Carbon Dioxide Gas Foaming Agent]

100 parts by weight of clear flakes supplied by Yono PET Bottle Recycle K. K. (from recycled PET bottles, intrinsic viscosity of 0.775 dl/g, MFR of 57 g/10 min, swell of −24%) hot-air dried at 120° C. for about 12 hours, 0.70 parts by weight of trifunctional trimethylol propane triglycidyl ether (Epolight 100MF from Kyoeisha Yushi Chemical Co., Ltd., having epoxy equivalence of 150 g/eg, pale yellow liquid) as a coupling agent, 0.10 parts by weight of calcium stearate as a coupling reaction catalyst, 0.05 parts by weight of manganous acetate tetrahydrate as another coupling reaction catalyst, and 1.0 parts by weight of talc having a diameter of about 2 μm as a foaming core agent were mixed in a Henschel mixer under nitrogen atmosphere for 2 minutes.

The flake mixture (D1) was reacted by kneading in a twin screw three stage vacuum extruder having L/D=43 and a caliber of 43 mm at a setting temperature of 280° C., and then directly fed to a single screw extruder having L/D=34 and a caliber of 50 mm at a setting temperature of 270° C. 5 parts by weight of carbon dioxide gas was added to 100 parts by weight of the mixed resin in the first stage cylinder. The pressure of the extruder was raised using a gear pump, and the resin was passed through a static mixer (having a caliber of 20 mm, 12 elements) set at a temperature of 250° C. to 225° C. per zone, and then cooled. The mixture was extruded into air with a circular die having a caliber of 85 mm and a gap of 0.2 mm at a die setting temperature of 225° C. to form a foamed article. Thus, a foam sheet having an expansion ratio of 12, a foam diameter of 0.15 mm to 0.35 mm, a thickness of 1 mm, and a wide of 700 mm was obtained.

Example 2
[Production of Extremely High Branched Polyester Resin (D) Using Trifunctional Epoxy Coupling Agent, and Foam Molding With Carbon Dioxide Gas Foaming Agent]

100 parts by weight of clear flakes supplied by Yono PET Bottle Recycle K. K. (from recycled PET bottles, intrinsic viscosity of 0.755 dl/g, MFR of 57 g/10 min, swell of −24%) hot-air dried at 120° C. for about 12 hours, 0.70 parts by weight of trifunctional trimethylol propane triglycidyl ether (Epolight 100MF from Kyoeisha Yushi Chemical Co., Ltd., having epoxy equivalence of 150 g/eq, pale yellow liquid) as a coupling agent, 0.15 parts by weight of calcium stearate as a coupling reaction catalyst, and 1.0 parts by weight of talc having a diameter of about 2 μm as a foaming core agent were mixed in a Henschel mixer under nitrogen atmosphere for 2 minutes.

The flake mixture (D1) was reacted by kneading in a twin screw two stage vacuum extruder having L/D=43 and a caliber of 43 mm at a setting temperature of 270° C. to form a polyester resin for foam molding. Then, the polyester resin was directly fed to a single screw extruder having L/D=34 and a caliber of 50 mm at a setting temperature of 270° C. 7 parts by weight of carbon dioxide gas was added to 100 parts by weight of the mixed resin in the first stage cylinder. The pressure of the extruder was raised using a gear pump, and the resin was passed through a single screw extruder having a caliber of 65 mm and L/D=28 set at a temperature of 250°c to 215° C. per zone, and then cooled. The mixture was extruded into air with a circular die having a caliber of 85 mm and a lip gap of 0.15 mm at a die setting temperature of 225° C. to form a foamed article. Thus, a foam sheet having an expansion ratio of 21, a foam diameter of 0.15 mm to 0.35 mm, a thickness of 1 mm, and a width of 700 mm was obtained.

Example 13
[Series Production of Extremely High Branched Polyester Resin (E) Using Bifunctional and Trifunctional Epoxy Coupling Agents, and Foam Molding With Carbon Dioxide Gas Foaming Agent]

Figure 4:
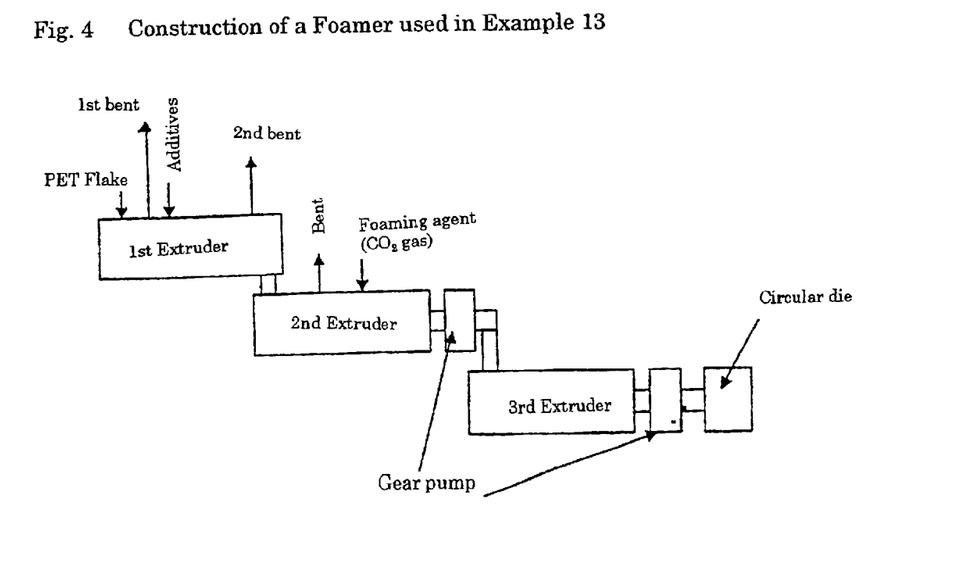

This example will be described referring to FIG. 4, in which a combination of devices is shown.

Clear flakes supplied by With PET bottle recycle K. K. (from recycled PET bottles, intrinsic viscosity of 0.735 dl/g, MFR of 52 g/10 min, swell of −19%) were fed to a hopper without drying, and melted in a first corotating twin screw extruder having L/D=43, and a caliber of 43 mm (one side feed, two vacuum vents front and back of the side feed) at a setting temperature of 280° C. 0.24 parts by weight of bifunctional ethylene glycol diglycidyl ether (Epolight 40E from Kyoeisha Yushi Chemical Co., Ltd.) as a coupling agent, 0.36 parts by weight of trifunctional trimethylol propane triglycidyl ether (Epolight 100MF from Kyoeisha Yushi Chemical Co., Ltd.) as another coupling agent, 0.10 parts by weight of calcium stearate as a coupling reaction catalyst, 0.10 parts by weight of manganous acetate tetrahydrate as another coupling reaction catalyst, and 1.0 parts by weight of talc having a diameter of about 2 μm as a foaming core agent were added to 100 parts by weight of the PET resin flakes from the side feed hole of the first extruder, and kneaded and subjected to vacuum of −600 mmHg or less from the two vacuum vents to proceed the reaction. The flake mixture was directly fed to the co-rotating twin screw second extruder having a caliber of 40 mm and L/D=44 at a setting temperature of 270° C. 7 parts by weight of carbon dioxide gas was added to 100 parts by weight of the mixed resin in the cylinder. The pressure of the extruder was raised up to 9 MPa to 30 MPa using a gear pump with 30 cc/rev, and the resin was passed through a single screw first extruder of 65 mm caliber and L/D=28 having zones set at temperatures of 250° C. to 215° C., and then cooled. Using a gear pump with 30 cc/rev connected at the end of the extruder a discharge rate was stabilized, then the mixture was extruded into an atmosphere through a circular die having a caliber of 85 mm and a lip gap of 0.15 mm at a die setting temperature of 220° C. to form a foamed article. Thus, a foam sheet having an expansion ratio of 21, a foam diameter of 0.15 mm to 0.35 mm, a thickness of 1 mm, and a width of 700 mm was obtained.

The results of Examples and Comparative Examples are summarized below in Table 1.

TABLE 1

| | Resin | Type | intrinsic viscosity (dl/g) | MFR (g/10 min) | Swell (%) | Foam process ability |
|---|---|---|---|---|---|---|
| Ex. 1–3 | A | medium branching | 0.834 | 12 | +54 | good |
| Ex. 4–5 | B | highly branched | 0.790 | 5.2 | +112 | excellent |
| Ex. 6 | C | extremely high branching | 0.882 | 1.8 | +160 | fairly good |
| Ex. 7, 8, 10–12 | D | highly branched | 0.89 | 2.0 | +85 | excellent |
| Ex. 9, 13 | E | highly branched | 0.84 | 4.4 | +77 | excellent |
| Comp. Ex. 1 | recycled PET | linear flakes | 0.775 | 65 | −23 | bad |
| Comp. Ex. 2 | commercial PET1 | linear | 0.72 | 57 | −10 | bad |
| Comp. Ex. 3 | commercial PET2 | linear | 0.83 | 23 | −10 | bad |
| Comp. Ex. 4 | commercial PET3 | linear | 0.98 | 14 | +3.0 | bad |
| Comp. Ex. 5 | commercial PET4 | linear | 1.19 | 8.3 | +3.2 | bad |

MFR: 280° C., load 2.16 kg

Industrial Applicability

The PET-based polyester of the present invention has high melting tension and swell (degree of swelling), whereby a foamed article can easily be formed using a volatile foaming agent or a heat decomposable foaming agent. The foamed article has excellent mechanical strength such as heat resistance, and tensile strength, and is useful for cushioning material, heat insulating material, packaging material, food containers, and partition panels in civil engineering and construction, electric and electronics, automobiles, commodities, and packaging arts. It is a social advantage that a large volume of recovered PET bottles can be effectively utilized in large quantities as a prepolymer. Even if the PET-based polyester used is incinerated, the incinerator will be damaged less since the polyester has a low calorific value of combustion, about half of that of polyethylene and polypropylene.

What is claimed is:

1. A method for producing a foamed article by first making modified polyester resin pellets having increased swell of 5 to 200% and JIS melt flow rate (MFR) of not more than 50 g/10 minutes measured at 280° C. by preliminary heating a mixture comprising (a) 100 parts by weight of a recycled product of a recovered polyethylene terephthalate-based aromatic polyester molded product, (b) 0.1 to 10 parts by weight of a mixture as a coupling agent of 0 to 75% by weight of a compound having two epoxy groups in the molecule, and 100 to 25% by weight of a compound having more than two epoxy groups, and (c) 0.01 to 5 parts by weight of a metal salt of a carboxylic acid as a coupling reaction catalyst to a temperature greater than the melting point of said polyester, and secondly heat foaming said modified polyester resin using a foaming agent;

wherein the use of 100 to 25% by weight of a compound having more than two epoxy groups increases swell.

2. A method for producing a foamed article comprising; heating in an extruder a mixture comprising (a) 100 parts by weight of a recycled product of a recovered polyethylene terephthalate-based aromatic polyester molded product, (b) 0.1 to 10 parts by weight of a mixture as a coupling agent of 0 to 75% by weight of a compound having two epoxy groups in the molecule and 100 to 25% by weight of a compound having more than two epoxy groups, and (c) 0.01 to 5 parts by weight of a metal salt of a carboxylic acid as a coupling reaction catalyst, to a temperature greater than the melting point of said polyester to make a modified polyester resin having increased molecular weight, melt viscosity and swell; injecting a foaming agent into said modified polyester resin in said extruder; and heat foaming the modified polyester resin;

wherein the use of 100 to 25% by weight of a compound having more than two epoxy groups increases swell.

3. The method for producing a foamed article as claimed in claim 1 or 2, wherein the foaming agent is a volatile foaming agent.

4. The method for producing a foamed article as claimed in claim 3, wherein the volatile foaming agent is an inert gas.

5. The method for producing a foamed article as claimed in claim 4, wherein the inert gas is carbon dioxide gas or nitrogen gas.

6. The method for producing a foamed article as claimed in claim 1 or 2, wherein the foaming agent is a heat decomposable foaming agent.

7. The method for producing a foamed article as claimed in claim 1 or 2, wherein the foamed article has an expansion ratio of 1.2 to 100.

8. The method for producing a foamed article as claimed in claim 1 or 2, wherein the linear saturated polyester is polyethylene terephthalate-based aromatic polyester having an intrinsic viscosity of 0.50 to 0.90 dl/g.

9. The method for producing a foamed article as claimed in claim 1, wherein the compound having two epoxy groups in the molecule as the coupling agent contains at least one or more selected from the group consisting of aliphatic polyethylene glycol diglycidyl ether, alicyclic hydrogenated bisphenol A diglycidyl ether, aromatic bisphenol A diglycidyl ether, and bisphenol A diglycidyl ether initial condensate.

10. The method for producing a foamed article as claimed in claim 1, wherein the compound having more than two epoxy groups in the molecule as the coupling agent contains at least one or more selected from the group consisting of aliphatic trimethylolpropane triglycidyl ether, glycerin triglycidyl ether, heterocyclic triglycidyl isocyanurate, aromatic phenol novolac epoxy resin, cresol novolac epoxy resin, and bisresorcinol tetraglycidyl ether.

11. The method for producing a foamed article as claimed in claim 1, wherein a polyethylene terephthalate-based aromatic polyester is used, which is obtained by chain reacting a linear saturated polyester prepolymer having an intrinsic viscosity of 0.50 to 0.90 dl/g via an ester bond having a by-product hydroxyl group, and has a branched long chain.

12. A method for producing a foamed article comprising; heating in an extruder a mixture comprising (a) 100 parts by weight of an undried recycled product of a recovered polyethylene terephthalate-based aromatic polyester molded product melted at a temperature above the melting point thereof, and deaerated to less than −600 mmHg, (b) 0.1 to 10 parts by weight of a mixture as a coupling agent of 0 to 75% by weight of a compound having two epoxy groups in the molecule and 100 to 25% by weight of a compound having more than two epoxy groups, and (c) 0.01 to 5 parts by weight of a metal salt of a carboxylic acid as a coupling reaction catalyst to a temperature greater than the melting point of said polyester to make a modified polyester resin having increased swell of 5 to 200% and JIS melt flow rate (MFR) of not more than 50 g/10 minutes measured at 280° C.; injecting a foaming agent into said modified polyester resin in said extruder wherein the foaming agent is dissolved in the modified polyester resin under pressure and cooling; and releasing the modified polyester resin into the atmosphere through a die of said extruder;

wherein the use of 100 to 25% by weight of a compound having more than two epoxy groups increases swell.

* * * * *